April 13, 1943.        H. F. LANG        2,316,520
ACCOUNTING MACHINE
Filed Aug. 2, 1940                6 Sheets-Sheet 1

FIG. 1

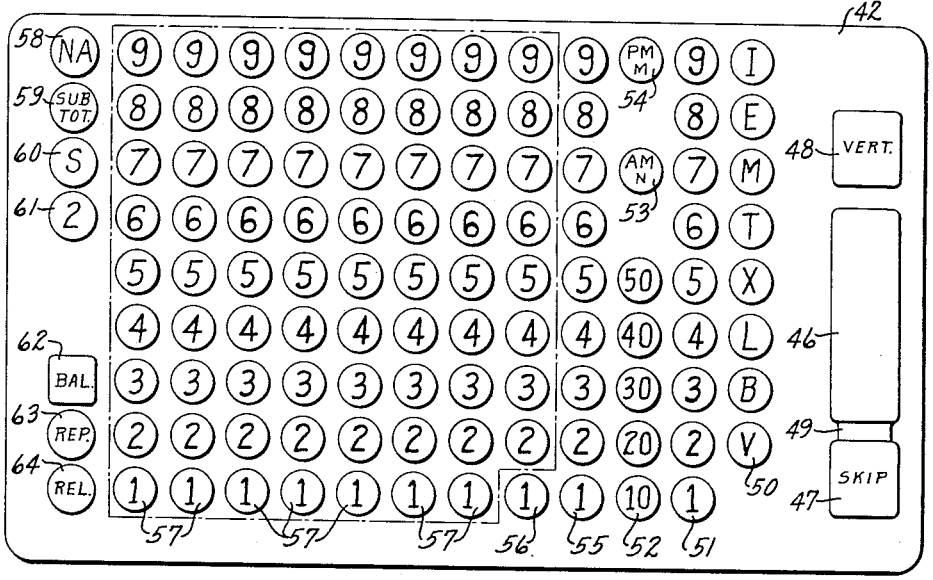

FIG. 2

| DAYS | A.M. PERIOD | | P.M. PERIOD | | OVER-TIME | | TOTAL TIME | TOTAL TIME |
|---|---|---|---|---|---|---|---|---|
| | IN | OUT | IN | OUT | IN | OUT | WEEKLY | MONTHLY |
| MONDAY | 8:25 | 11:40 | 12:10 | 4:05 | | | | |
| TUESDAY | 8:20 | 11:30 | 12:30 | 8:20 | | | | |
| WEDNESDAY | 8:15 | 12:00 | 12:20 | 9:30 | | | | |
| THURSDAY | 7:50 | 11:30 | 12:10 | 4:06 | | | | |
| FRIDAY | 8:15 | 12:00 | 12:20 | 5:30 | | | | |
| SATURDAY | 7:50 | 11:40 | 12:10 | 2:06 | | | 53:22# | 53:22-- |
| SUNDAY | | | | | | | | |
| MONDAY | 8:25 | 11:40 | 12:10 | 4:05 | | | | |
| TUESDAY | 8:20 | 11:30 | 12:30 | 4:20 | 5:30 | 7:20 | | |
| WEDNESDAY | 8:15 | 12:00 | 12:20 | 5:30 | | | | |
| THURSDAY | 7:50 | 11:30 | 12:10 | 4:06 | | | | |
| FRIDAY | 8:20 | 12:00 | 12:30 | 4:27 | | | | 53:22 |
| SATURDAY | 7:35 | 11:40 | 12:10 | 2:16 | | | 46:19# | 99:41-- |
| SUNDAY | | | | | | | | |

Ledger Sheet — CLOCK NUMBER - 12345 — NAME - JOHN DOE — ADDRESS - 000 BLANK ST. — DATE- APRIL 1, 1940

Signals:
 # Sub.Total & Non Add
 – Subtract
 * No. 2 Total
 -- Balance

Henry F. Lang
Inventor

By  Carl Beust
His Attorney

April 13, 1943.                H. F. LANG                 2,316,520
                          ACCOUNTING MACHINE
                          Filed Aug. 2, 1940           6 Sheets-Sheet 2
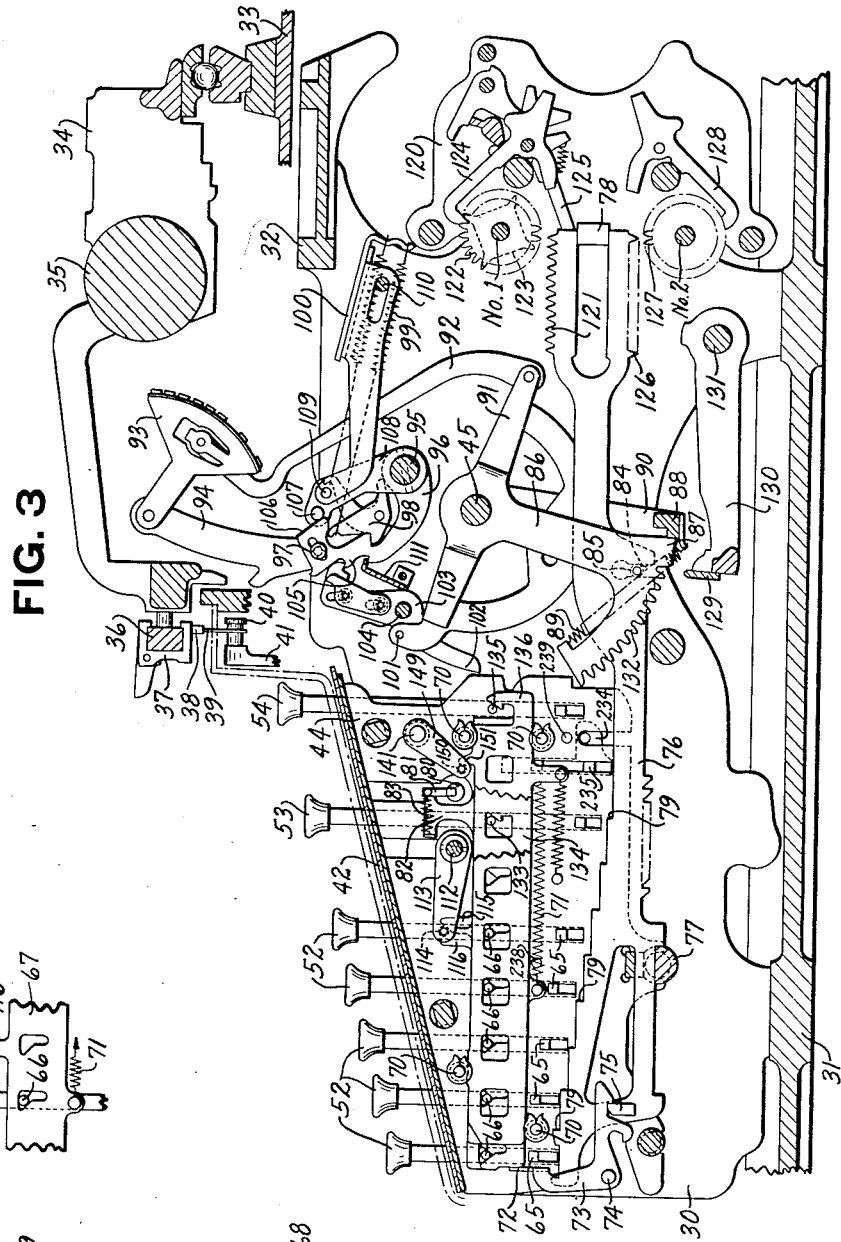
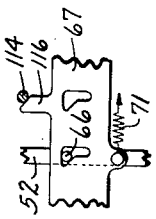
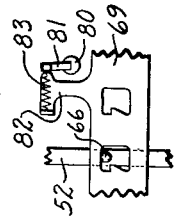
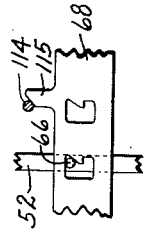
Henry F. Lang
Inventor
By Carl Bennet
His Attorney

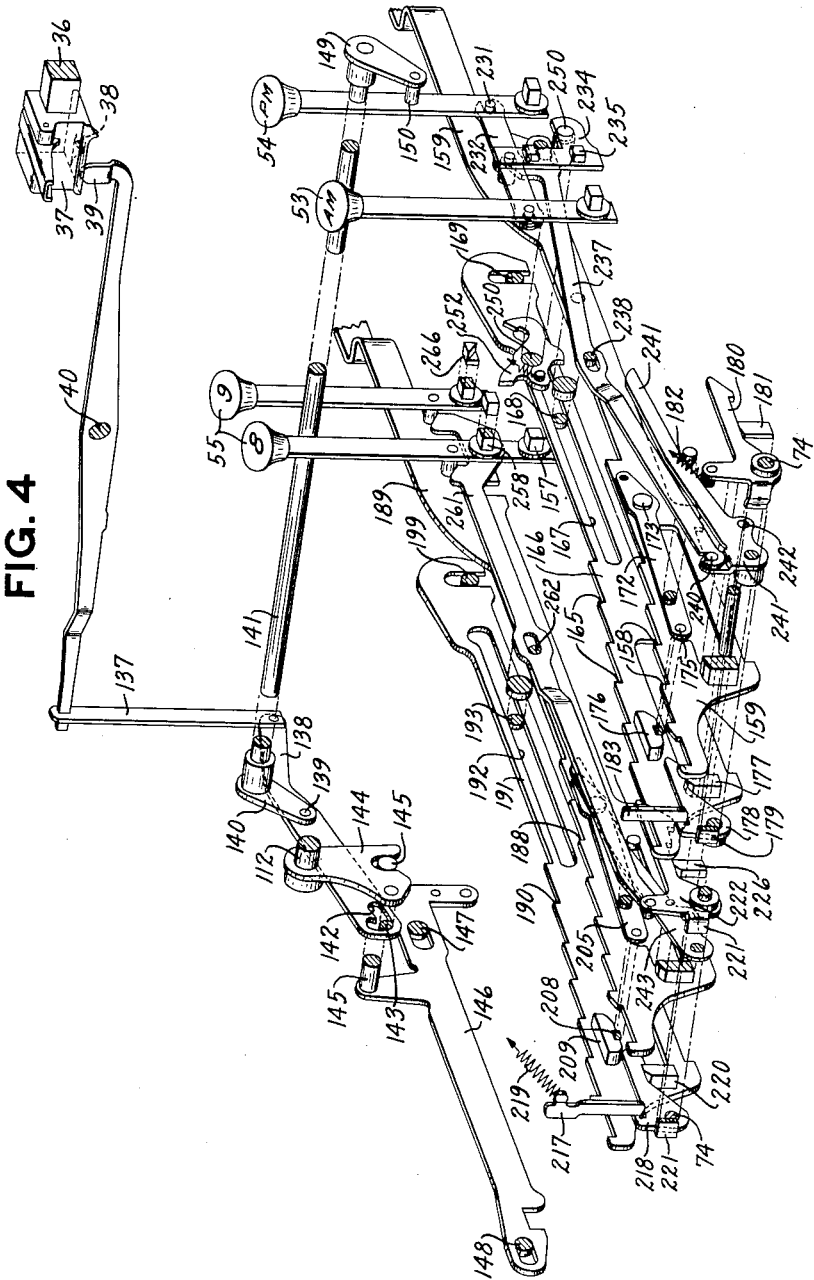

April 13, 1943. H. F. LANG 2,316,520
ACCOUNTING MACHINE
Filed Aug. 2, 1940 6 Sheets-Sheet 4

Henry F. Lang
Inventor
By Earl Beust
His Attorney

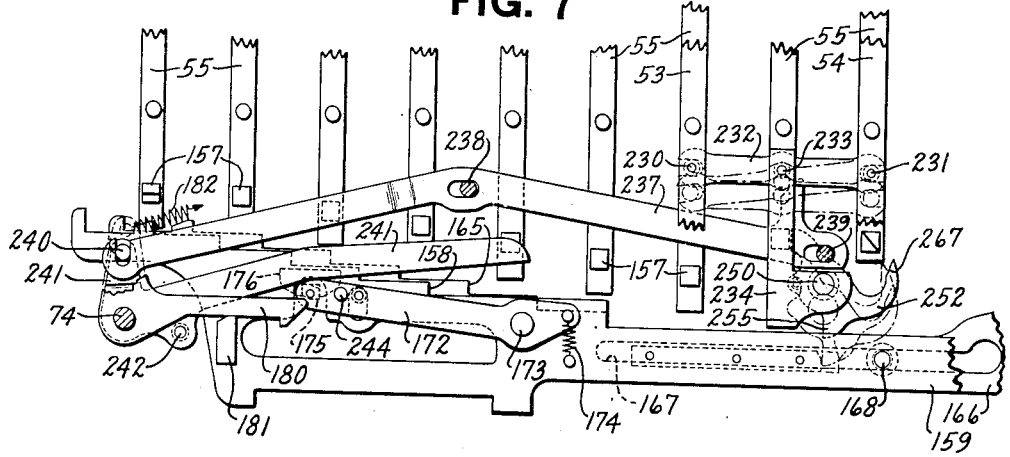
FIG. 7
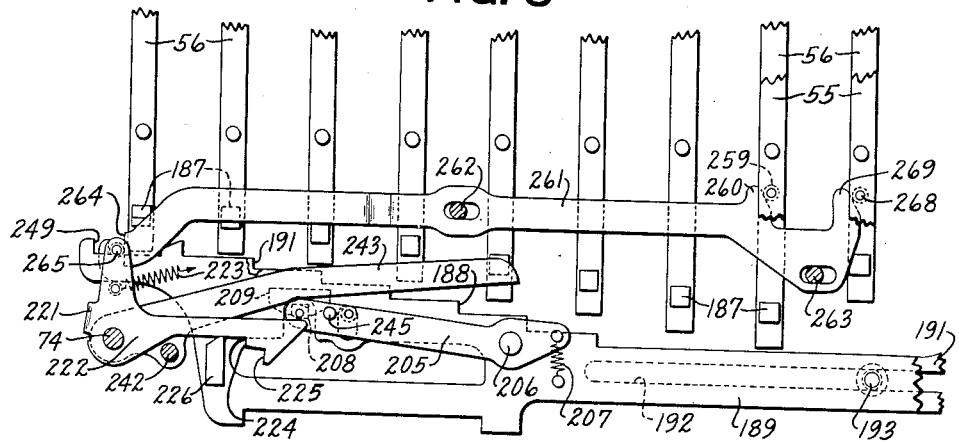
FIG. 8
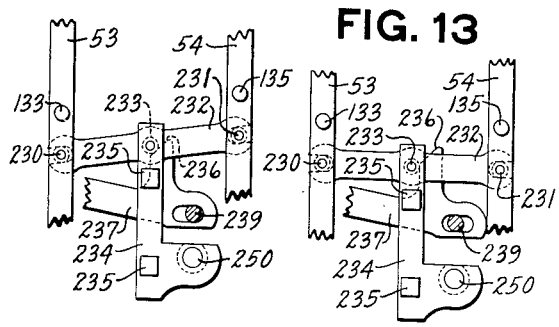
FIG. 12  FIG. 13
FIG. 14   FIG. 15
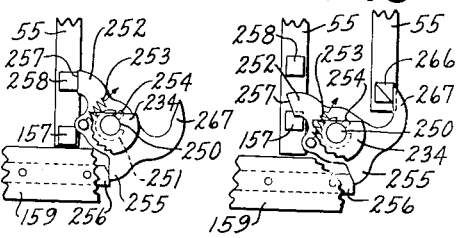
Henry F. Lang
Inventor
By *Earl Benst*
His Attorney Patented Apr. 13, 1943

2,316,520

UNITED STATES PATENT OFFICE 2,316,520

ACCOUNTING MACHINE

Henry F. Lang, Dayton, Ohio, assignor to The National Cash Register Company, Dayton, Ohio, a corporation of Maryland Application August 2, 1940, Serial No. 349,784

10 Claims. (Cl. 235—60)

This invention relates to improvements in bookkeeping or accounting machines and the like and is particularly directed to the keyboard and associated mechanisms of machines of the type disclosed in Letters Patent of the United States Nos. 1,197,278 and 1,203,863 issued respectively September 5, 1916, and November 7, 1916, to Halcolm Ellis; United States Patent No. 1,819,084 issued August 18, 1931, to Emil John Ens; United States Patents Nos. 2,038,717 and 2,082,098 issued respectively April 28, 1936, and June 1, 1937, to Raymond A. Christian; United States Patent No. 2,189,851 issued February 13, 1940, to Paul H. Williams et al.; and application for Letters Patent of the United States, Serial No. 104,001, filed October 5, 1936, by Jesse R. Ganger, which application issued as Patent No. 2,277,851 on March 31, 1942.

The mechanism of the present invention is shown embodied in a standard type of accounting machine, and a good example of use of the machine embodying this invention is that of a large business institution, such as a bank, for posting and totaling the number of hours and minutes worked by each of its employees in a given period of time, such as a week or month. This posting and totaling includes the starting and stopping or "in" and "out" times of the A. M. and the P. M. periods and the computing and totaling of the elapsed time between said "in" and "out' times. The data for the posting and totaling is obtained from the "in" and "out" recordings on each employee's time card or ticket, and the results of said posting and totaling are recorded on a corresponding ledger sheet for said each employee.

It is not the desire to limit the machine of this invention to the particular use outlined above, as there are obviously many other ways in which such a machine may be used to advantage without departing from the spirit and scope of this invention.

The primary object of this invention is to provide a standard type of accounting machine with means for computing and recording intervals of elapsed time in hours and minutes.

Another object of this invention is the provision of means to record and compute the passage of time worked by an employee between the various starting and stopping or "in" and "out" periods of a working day.

A further object is to supply means to automatically compensate for the change from A. M. to P. M. time in one daily work period or vice versa, to cause the proper time to be recorded and to cause the proper elapsed time to be accumulated.

Still another object is to provide means effective, when the starting and stopping time of one work period includes both A. M. and P. M. time, to automatically compensate for this transition, to cause the proper time to be recorded and the proper elapsed time to be simultaneously calculated.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In said drawings:

Fig. 1 is a diagrammatic view of the keyboard of the machine embodying the instant invention.

Fig. 2 is a facsimile of a fragmentary portion of a time record or ledger sheet prepared on the machine of this invention.

Fig. 3 is a sectional view, taken just to the right of the tens of minutes key bank, showing in particular said key bank and the printer and accumulator actuating mechanism associated therewith.

Fig. 4 is a spread-out perspective view, showing in particular the A. M. and the P. M. keys and the mechanism associated therewith for controlling the actuator mechanisms of the units and tens of hours key banks. Fig. 4 likewise shows the mechanism under control of the traveling carriage in tabulated positions thereof, for releasing the A. M. and the P. M. keys.

Figures 5, 6:
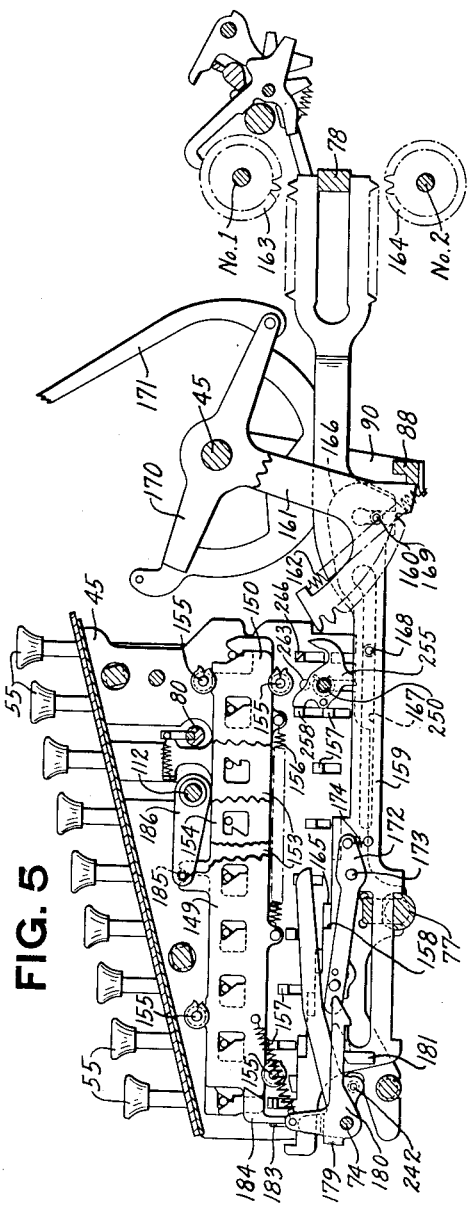

Fig. 5 is a sectional view, taken just to the right of the units of hours bank, showing in particular the actuator mechanism for this bank.

Fig. 6 is a sectional view, taken just to the right of the tens of hours bank, showing the actuator mechanism therefor.

Fig. 7 is an enlarged detail view of the units of hours bank, showing in particular the mechanisms associated with the A. M. and the P. M. keys, and the 8 and the 9 keys of the units of hours bank.

Fig. 8 is an enlarged detail view of the tens of hours bank, showing in particular the mechanism associated with the 8 and 9 keys of the units of hours bank for controlling the positioning of the auxiliary actuator of said tens of hours bank.

Figs. 9, 10, and 11 are detail views of, respectively, the locking plate, the control plate, and the detent for the tens of minutes keys shown in Fig. 3.

Figs. 12, 13, 14 and 15 are detail views showing how the A. M. and the P. M. keys, when both are depressed, control the positioning of the auxiliary actuators of the hour banks, to cause a corrective figure of 12 hours to be accumulated in the balance totalizer.

Figure 16:
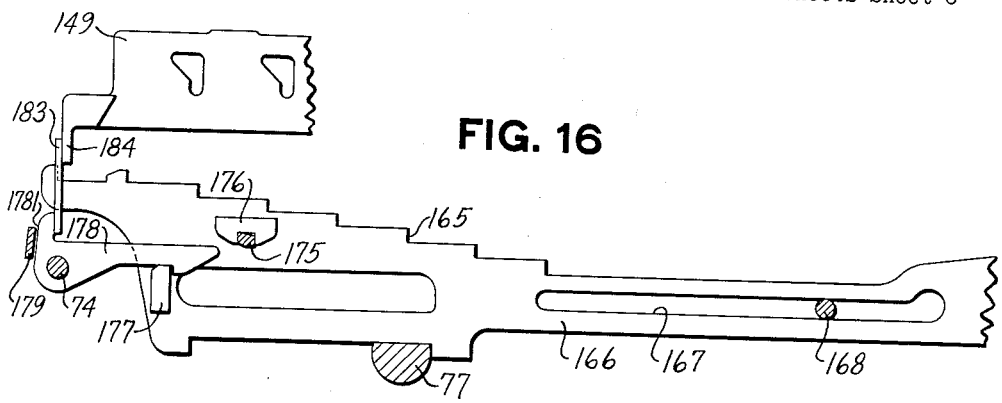

Fig. 16 is a detail view of the main actuator in the units of hours bank.

GENERAL DESCRIPTION

The machine chosen to illustrate the present invention is of a well-known type and is provided with a front-feed traveling carriage which may be automatically or manually tabulated from right to left during machine operations and which may be automatically returned from tabulated positions to starting position or, if desired, to certain predetermined intermediate positions.

The present machine is provided with the regular starting bar, which initiates machine operation and causes the traveling carriage to be automatically tabulated from one column to the next. A vertical feed starting bar is also provided for initiating machine operation and for causing the traveling carriage to remain stationary while the platen roll is rotated to line-space the record material. A skip tabulating starting bar is also provided for initiating machine operation and for causing the traveling carriage to be skip-tabulated from one columnar position through intervening columnar positions to one or more predetermined columnar positions. The vertical feed and skip-tabulating mechanisms, as well as the regular starting bar mechanism mentioned above, are fully disclosed in the Christian Patent No. 2,082,098 referred to hereinbefore.

In addition to the three starting bars mentioned above, the keyboard of the machine of this invention includes a row of symbol keys for printing symbols for identifying various data, four rows of time keys including units and tens of minutes and units and tens of hours, an A. M. and a P. M. key for controlling the recording and computing of time when both A. M. time and P. M. time are included in one working period, seven rows of amount keys for controlling the addition and substraction of regular amounts, such as dollars and cents, and a row of control keys for controlling the various functions of the machine. If desired, the units and tens of hours keys may be used in conjunction with the seven rows of amount keys for controlling the addition and subtraction of regular amounts.

The A. M. key and the P. M. key are used in connection with the hours and minutes keys for computing or figuring elapsed time. When both of these keys are depressed in one A. M. or P. M. period, they cause a corrective factor of 12 hours to be added to the total elapsed time, as will be explained more fully later. The hours and minutes keys may be used in conjunction with the regular amount keys for the recapping or totaling of all time over an extended period, such as a week or a month, and in this case the A. M. and the P. M. keys are not used.

Each of the units and tens of hours key banks has a main actuator rack and an auxiliary actuator rack, which are normally connected for unitary movement, the main rack being connected to the corresponding printing sector and the auxiliary rack having thereon teeth which cooperate with the corresponding totalizer wheels. When the A. M. and P. M. keys are both depressed in the same operation, to cause the corrective factor of 12 hours to be added, the depression of these keys causes the auxiliary actuators to be disconnected from their corresponding main actuators, thereby permitting said main actuators to be positioned by the depressed keys in the hours rows, to position their corresponding printing sectors in proportion thereto. When both the A. M. and the P. M. keys are depressed, the corrective factor of 12 hours influences the positioning of the auxiliary actuators. Consequently, this factor, plus the value of the depressed hours keys, is entered in the balance totalizer.

The units of minutes key bank and the seven banks of regular amount keys are standard in every respect. Depressing any of the keys in these banks controls the positioning of their respective actuators commensurate with the value of said keys, and said actuators in turn position their respective printing sectors and corresponding totalizer wheels in proportion to the value of said depressed keys.

The present machine is provided with two totalizers arranged vertically at the rear of the machine, and these totalizers include a No. 1 or balance totalizer, in which positive or negative amounts may be accumulated and in which the computation of all elapsed time takes place, and a No. 2 or adding totalizer, which may be used for the accumulation of amounts other than time. As disclosed in the above-mentioned United States patent to Williams et al., No. 2,189,851, the No. 2 totalizer is selected for addition, and the balance totalizer is selected for addition or subtraction, by means of hanging bar levers which are operated by control blocks mounted upon a removable bar supported by the traveling carriage, said control blocks being arranged in columnar positions of said traveling carriage. The other functions of the totalizers, including non-add, subtotal, total or balance, and repeat operations, as well as subtract operations, are controlled by means of the row of control keys located on the extreme left of the keyboard.

The mechanism outlined in general above and pertinent to the instant invention will be described in detail in the following pages.

DETAILED DESCRIPTION

Framework

Referring to Fig. 3, the main mechanism of the machine embodying this invention is supported by right and left side frames, only one (the left frame 30) being here shown, said frames being secured to a machine base 31, which, in cooperation with a cross frame 32 and various other cross frames, rods, and bars, supports said side frames in rigid relationship to each other. The mechanism of the machine is enclosed in a suitable case or cabinet 33, which is secured to the machine base 31, said case adapted to support on the top thereof a traveling carriage 34 for lateral shifting movement.

The framework of the traveling carriage 34 rotatably supports a platen roll 35 of the front-feed type adapted to be moved from printing position, as here shown, to a more accessible position, to permit the ready insertion and removal of record material without necessitating the rotation of said platen roll to feed the record material therearound. The framework of the traveling carriage 34 has removably mounted at the top thereof a control block bar 36, which supports a plurality of control blocks 37, only one here shown, which may be adjusted along the bar to correspond to various predetermined columns on record material to be acted upon by the machine. The control blocks 37 have thereon a plurality of camming projections 38, which cooperate with the upturned ends of corresponding hanging bar levers 39 rotatably mounted on a stud 40 in a cross frame 41 extending between the main frames of the machine.

Two of the hanging bar levers 39 control respectively the adding function of the No. 1 or balance totalizer and the adding function of the No. 2 totalizer, another hanging bar lever controls the subtracting function of the balance totalizer, another hanging bar lever controls mechanism that locks the machine releasing mechanism against operation when the traveling carriage is out of columnar position, and the hanging bar lever 39 (here shown) controls the releasing of the A. M. and the P. M. keys, as will be explained fully later. The control blocks also have stopping lugs, which, in cooperation with a tabulating stop bar, control tabulation of the traveling carriage from one column to the next. The hanging bar mechanism and the tabulating mechanism are old in the art and are fully disclosed in the Christian patents referred to hereinbefore.

Keyboard and operating mechanism

Referring to Figs. 1, 3, 5, and 6, the keyboard framework of the present machine comprises a top plate 42, right and left end plates (not shown), and a partition plate 43 (Fig. 6) for each of the key banks with the exception of the tens of minutes key bank and the units of hours key bank, which have their respective partition plates 44 and 45. The top plate 42 is secured to the main frames of the machine to maintain the keyboard in fixed relationship to the machine proper.

Extending through the top plate 42 (Fig. 1) of the keyboard are a regular starting bar 46, a skip tabulating starting bar 47, and a vertical feed starting bar 48. Depressing either of the starting bars 46 or 48 closes the electrical circuit to a standard type of start-stop motor and simultaneously clutches said motor to the machine operating mechanism, causing said motor to oscillate a leading frame shaft 45 (Fig. 3) first counter-clockwise and then back to normal position, in which position it is here shown. After the shaft 45 has completed its full cycle of movement, the motor clutch mechanism is automatically disconnected and the circuit to the motor is broken.

In addition to causing the machine to operate, depression of the starting bar 46 also causes the traveling carriage 34 to be tabulated from one columnar position to the next, and depression of the vertical feed starting bar 48 controls mechanism which prevents tabulation of the traveling carriage but causes the platen roll 35 of said carriage to be rotated a given increment to line-space the record material supported thereby. A downward extension 49 (Fig. 1) of the starting bar 46 extends underneath the skip tabulating starting bar 47; consequently, depression of said skip tabulating starting bar also depresses the starting bar 46 to cause the machine to operate as outlined above. In addition, depression of the skip tabulating bar 47 causes the traveling carriage 34 to be skip tabulated from one columnar position through one or more intervening columnar positions to a predetermined columnar position. The usual non-repeat mechanism is provided for preventing repeat operation of the machine in case any of the starting bars is inadvertently retained depressed at the end of machine operation.

The keyboard also includes a row of symbol printing keys 50, a row of units of minutes keys 51, five tens of minutes keys 52, an A. M. key 53, a P. M. key 54, a row of units of hours keys 55, a row of tens of hours keys 56, seven rows of amount keys 57, a non-add key 58, a sub-total key 59, a subtract key 60, a No. 2 total key 61, a No. 1 total or balance key 62, a repeat key 63, and a release key 64. The symbol keys 50 are for printing symbols to identify various data.

The time keys, including the hours and minutes keys, are used for computing the elapsed time worked by employees over an extended period, and are used in conjunction with the A. M. key 53 to print and compute A. M. time and with the P. M. key 54 to print and compute P. M. time, as will be explained more fully later. In the computation of elapsed time, only the No. 1 key in the tens of hours bank is used. However, in the recapping or totaling of the total number of hours over an extended period, any of the keys 56 in the tens of hours row may be used, as well as any of the keys in the amount rows 57, in conjunction with the units of hours keys and the minute keys for printing and accumulating this total time. For printing ordinary amounts, such as dollars and cents, the two rows of hours keys 55 and 56 may be used in conjunction with the regular amount banks 57. However, in the printing of regular amounts, it is impossible to use the minute key banks, as the tens of minutes bank has a 12-place differential mechanism, which transfers every sixth increment of movement.

The non-add key 58 prevents the selection of either of the totalizers for adding. Consequently, any item set up on the keys 51 to 57 will be printed only when this key is depressed and will not be accumulated in either of the totalizers.

The sub-total key 59, when used in conjunction with the balance key 62 or the No. 2 total key 61, causes the sub-total of the amount contained in these totalizers to be printed. While the balance totalizer is usually selected for subtract operations by means of control blocks on the traveling carriage in cooperation with their subtract hanging bar lever, the subtract key 60 may be used as an alternative for effecting a subtract operation in this totalizer. The No. 2 total key 61 and the balance key 62 are used when it is desired to clear their corresponding totalizers and print a total of the amount therein.

The regular key release mechanism releases all depressed keys 50 to 57, with the exception of the A. M. and the P. M. keys 53 and 54, near the end of adding or subtracting operations, and in sub-total and total-taking operations this mechanism functions near the beginning of machine operations to release any inadvertently depressed key prior to such sub-total or total-taking operations. Depressing the repeat key 63 (Fig. 1) renders the key releasing mechanism inoperative near the end of adding and subtracting operations to prevent release of the depressed keys, so that the data set up thereon will be repeated in the next machine operation. The balance key 62 is a so-called "motorized" key and, in addition to causing the balance totalizer to be selected for a balancing operation, also controls the machine releasing mechanism to cause the machine to operate.

Actuator mechanism

The actuator or differential mechanism shown in connection with the tens of minutes keys 52 (Fig. 3) is similar to the actuator mechanism for the keys 51 and 57, and it is believed that a description of this actuator mechanism will suffice for all.

Referring to Figs. 3, 9, 10, and 11, the upper ends of the tens of minutes keys 52 extend through the keyboard plate 42, while each of said keys carries in its lower end a stud 65 which engages a corresponding vertical slot in the partition plate 44 for this particular key bank. Each of the keys 52 carries a stud 66 which extends through a vertical slot in the partition plate 44, through a corresponding camming aperture in a control plate 67 (Fig. 10), and through a corresponding aperture in a detent 68 (Fig. 11). The detent 68 is provided with a retaining tooth formed in one wall of the said aperture. The stud 66 also extends through an aperture in a locking plate 69, one wall of which aperture has formed therein a locking tooth which is reversed to the tooth in the detent 68. The control plate 67, detent 68, and locking plate 69 are mounted adjacent each other for horizontal shifting movement between rollers supported by four studs 70 secured in the partition plate 44, said rollers being held in place on said studs by spring clips, which engage annular grooves in the ends of said studs 70. A spring 71 (Fig. 3) tensioned between the control plate 67 and the detent 68 urges said parts rearwardly and forwardly, respectively. Depression of one of the keys 52 causes the stud 66 therein, in cooperation with the corresponding camming slot in the control plate 67, to urge said control plate forwardly against the action of the spring 71. Forward movement of the control plate 67 causes a forward extension thereof, in cooperation with a bent-over ear 72 on a zero stop pawl 73 pivoted on a rod 74 supported by the keyboard framework, to rock said pawl 73 counter-clockwise against the action of a spring (not shown). Counter-clockwise movement of the zero stop pawl 73 disengages the hook on the rearward end thereof from a block 75 carried by an actuator rack 76 for this particular bank. The actuator 76 is mounted for horizontal shifting movement by the front end thereof engaging a slot in a rod 77 supported by the main frames 30, and by a bifurcated rear portion which straddles a bar 78 also supported by the main framework 30.

Depressing one of the ten of minutes keys 52 moves the stud 65 therein opposite the corresponding one of a series of graduated steps 79 on the actuator 76 to position said actuator, upon operation of the machine, in proportion to the value of said depressed key, as will be explained later. Depressing one of the keys 52 causes the stud 66 therein to by-pass the corresponding hook in the aperture of the detent 68, after which the spring 71 returns said detent forwardly to cause the hook, in cooperation with the stud 66, to retain the key 52 in depressed position (Fig. 11).

At the beginning of machine operation, a key locking shaft 80 (Figs. 3 and 9), journaled in the framework of the keyboard, receives clockwise movement to retract an upwardly projecting piece 81, mounted in a slot therein, from a nose of an extension 82 of the locking plate 69. A spring 83, connected between the piece 81 and a bent-over ear of the projection 82, causes the plate 69 to move rearwardly as said piece 81 is retracted to move the hooks in the apertures in said plate beneath the studs 66 in the corresponding undepressed keys 52 to lock said keys against depression during machine operation.

The actuator 76 has a vertical slot 84 (Fig. 3) therein, which engages a stud 85 in a downward extension of a reducing arm segment 86 free on the shaft 45. A nose 87 of the segment 86 is normally maintained in yielding engagement with a leading frame bar 88 by a spring 89 tensioned between said bar and said segment. Opposite ends of the bar 88 are integral with two similar arms 90 (only one here shown) secured in the shaft 45. An extension 91 of the segment 86 pivotally supports the lower end of a link 92, the upper end of which is pivoted to a printing sector 93 for this particular bank, said sector in turn being pivotally connected to a printer operating arm 94 free on a shaft 95 journaled in the framework of the printer mechanism.

A printer arm control plate 96, free on the shaft 95, is connected to the printer arm 94 by means of a slot in said plate which engages a stud 97 in said arm. A tension pawl 98, pivoted to the arm 94, is urged clockwise by a spring 99 tensioned between said pawl and a bracket 100 shiftably mounted in the printer framework to form a yielding connection between the plate 96 and the arm 94 to prevent rebounding of the printing sector 93 when it strikes the platen roll 35, as will be explained later.

Initial movement counter-clockwise of the shaft 45 (Fig. 3) and the leading frame bar 88, by means of the spring 89, carries the segment 86 in unison therewith to shift the actuator 76 rearwardly until the step 79 comes in contact with the stud 65 of the depressed key 52, to stop the rearward movement of the actuator 76 and the printing sector 86. However, the leading frame bar 88 is free to continue its full counter-clockwise movement, flexing the spring 89. This positions the actuator 76, the segment 86, and the printing sector 93 in proportion to the value of the depressed key 52. Initial movement counter-clockwise of the segment 86 causes a stud 101 in a forward extension thereof, in cooperation with an arcuate surface 102 on a control pawl 103 free on a shaft 104 in the printer framework, to rock said pawl counter-clockwise out of engagement with a tooth 105 in the control plate 96 to free said control plate for printing movement.

The plate 96 (Fig. 3) has a surface 106, which cooperates with a rod 107 extending between two similar arms 108 (only one here shown) secured on the printer shaft 95. Studs 109 in each of the arms 108 pivotally connect similar arms of the bracket 100 to said arms 108, and the rearward end of said bracket 100 is shiftably supported in the printer framework by means of slots in the two arms thereof in cooperation with studs 110 (only one here shown) in the side plates of the printer framework.

Initial movement clockwise of the shaft 95 and arms 108 withdraws the rod 107 from the surface 106 and shifts the bracket 100 rearwardly to tension the spring 99 to secure the proper power to drive the arm 94 and the printing sector 93 during their printing stroke. After the leading frame bar 88 has completed its initial movement counter-clockwise and the actuator 76, the segment 86, and the printing sector 93 have been positioned in proportion to the depressed key 52, a printing mechanism release trigger 111, mounted in the printer framework, is rocked counter-clockwise, in the well-known manner explained in the patents referred to herein, out of engagement with a tooth on the control plate 96. This releases the plate 96, the arm 94, and the printing sector 93 to the action of the tensioned spring 99, which causes said printing sector 93 to strike the platen 35 a hammer-like blow to print the value of the depressed key upon the record material supported by said platen.

Just before the printing sector 93 contacts the platen 35, the surface 106 strikes the rod 107. However, said printing sector has sufficient momentum to complete the printing stroke in an entirely satisfactory manner, and the yielding connection effected between the plate 96 and the arm 94 by the pawl 98 immediately withdraws the printing sector 93 a slight distance away from the platen 35 to prevent the possibility of smudging the record material when the traveling carriage is tabulated. Likewise, the tension between the plate 96 and the arm 94 is sufficient to prevent rebounding of the printing sector 93.

In case none of the keys 52 are depressed prior to a machine operation, the zero stop pawl 73 (Fig. 3) retains the actuator 76, the segment 86, and the printing sector 93 in zero position, and in this case, if no keys are depressed in the higher denominations, the pawl 103 remains in engagement with the tooth 105 to prevent printing stroke of the sector 93 when the trigger 111 is released. However, if keys are depressed in higher denominations, the well-known zero elimination mechanism rocks the pawl 103 out of engagement with the tooth 105 to permit the zero to be printed when the trigger 111 is released. Obviously, when one of the keys 52 is depressed prior to a machine operation, movement of the actuators 76 and the segments 86 out of zero position will rock the pawl 103 out of engagement with the tooth 105, as explained above.

After printing has been effected, return movement of the shaft 95 and the arms 108 causes the bar 107, in cooperation with the surface 106, to restore the arm 94 and the printing sector 93 to initial positions, as here shown, after which the release trigger 111 again engages the tooth in the plate 96 to retain said parts in restored positions.

A key release shaft 112 (Figs. 3 and 4), journaled in the main frames, has secured thereon a key releasing arm 113 for each bank of keys. Also secured on the left-hand end of the shaft 112 is an arm 144 slotted to embrace a stud 145 in a key releasing bar 146 mounted for horizontal shifting movement upon studs 147 and 148 in the left frame 30. The bar 146 is similar in every respect to, and receives its movement to rock the arm 144 and the shaft 112 first counter-clockwise and then back to normal position in exactly the same manner as, the bar 209 (Fig. 27) of the United States patent to Paul H. Williams et al., No. 2,189,851, to which reference may be had for a full disclosure of the mechanism not here shown.

After the leading frame bar 88 has completed its initial movement counter-clockwise in adding and subtracting operations, and the actuator 76 has been positioned in proportion to the depressed key, the key release shaft 112 and the arm 113 for the keys 52 are rocked counter-clockwise. Counter-clockwise movement of the shaft 112 and the arm 113 causes a stud 114 carried by said arm, in cooperation with opposed camming surfaces on projections 115 and 116 of the detent 68 and the control plate 67, to shift said detent and said control plate rearwardly and forwardly, respectively, against the action of the spring 71 (Figs. 3, 10, and 11). Rearward movement of the detent 68 disengages the corresponding hook thereon from the stud 66 of the depressed key 52, releasing said key to the action of its spring, which immediately restores said key upwardly to undepressed position. After the depressed key has been released, the shaft 112 and the arm 113 are returned clockwise to normal position, as here shown, to permit the spring 71 to return the detent 68 and the control plate 67 also to normal positions.

In sub-total and total-printing operations, the shaft 112 and the arm 113 receive their initial movement counter-clockwise at the beginning of machine operation but prior to initial movement of the leading frame bar 88 to shift the detent 68 rearwardly to release any inadvertently depressed key, and to shift the control plate 67 forwardly (Fig. 3) to rock the zero stop latch 73 out of engagement with the stud 75, so that the actuator 76 is free to move rearwardly under influence of the leading frame bar 88 to be positioned by the corresponding wheel of the totalizer being read or reset. Forward movement of the control plate 67 in adding and subtracting operations is but an idle movement and has no effect whatever upon the operation of the machine.

At the beginning of a machine operation, the shaft 80 receives clockwise movement to shift the locking plate 69 rearwardly to lock the undepressed keys against depression, as explained earlier, and near the end of a machine operation the shaft 80 is returned counter-clockwise to shift the locking plate 69 forwardly to normal position, as here shown. The locking plate 69 (Fig. 9) receives its locking movement rearwardly after the key releasing mechanism has functioned in the beginning of sub-total and total-taking operations, so that all keys will be locked against depression during such operations.

A separate mechanism is provided for releasing the A. M. and P. M. keys 53 and 54 (Figs. 1 and 3) and will be explained later in connection with a detailed description of these keys and their associated mechanisms. The keys in the banks 50, 51, 52, 55, 56, and 57 (Fig. 1) are provided with what is termed "flexible key action" in that the depression of one key in a row releases a previously depressed key in the same row, and so on.

*Totalizer*

As previously stated, the machine of this invention has two totalizers, the No. 1 or balance totalizer and the No. 2 or adding totalizer, mounted in vertical relationship to each other in a framework 120 (Fig. 3) secured to the main frame 30 at the rear of the machine. It is but a matter of assembly to add additional vertical pairs of totalizers by connecting a framework, similar to the framework 120, to said framework 120. The actuator 76 has, on the rearward end thereof, rack teeth 121 adapted to cooperate with the teeth of a corresponding balance totalizer wheel 122 free on the No. 1 totalizer shaft, which is mounted in a rockable framework, in turn supported in the framework 120. The wheel 122 has integral therewith a tripping cam 123 having four tripping teeth adapted to cooperate with an adding transfer pawl 124 or a subtract transfer pawl 125 to transfer a positive or a negative digit, as the case may be, to the next higher order.

Inasmuch as the bank shown in Fig. 3 is the tens of minutes bank, it is necessary that 1 be transferred to the next higher order each time the wheel 122 is moved through six places while traveling in a positive or a negative direction, and to accomplish this the wheel 122 is provided with 24 teeth and the tripping cam 123 is provided with four teeth, to operate the transfer mechanism each time the wheel 122 moves from fifth to sixth place in the adding direction and from sixth to fifth place in the subtracting direction. In the case of a subtract operation, if the tens order wheel is standing at "0" and "1" is subtracted therefrom, either directly by the actuator or by the transfer mechanism from the units order, the tens wheel will move from a "0" position to a "5" position.

The actuator 76 (Fig. 3) has, on the lower edge thereof, rack teeth 126, which cooperate with the teeth of a corresponding wheel 127 in a No. 2 or adding totalizer, said wheel being free on the No. 2 totalizer shaft, which, like the No. 1 totalizer shaft, is rockably mounted in the framework 120. Integral with the wheel 127 is a tripping cam (not shown) having diametrically opposed teeth, which cooperate with an adding transfer pawl 128 in exactly the same manner as the teeth of the tripping cam 123 cooperate with the No. 1 adding pawl 124 to add 1 to the next higher order when the wheel 127 passes from 9 to 0.

In adding and subtracting operations, after the actuator 76 has been positioned by the depressed keys and after the leading frame bar 88 has completed its initial movement counter-clockwise, as explained earlier herein, an alining bar 129 (Fig. 3), mounted between two arms 130 (only one here shown), secured on a shaft 131, is rocked counter-clockwise into engagement with a tooth space 132 in the segment 86, said tooth space corresponding to the value of the depressed key 52, to retain said segment 86, the actuator 76, and the printing sector 93 in set positions until said printing sector 93 completes its printing stroke, whereupon the aliner 129 is rocked out of engagement with the space 132 to the position here shown.

In adding operations, the wheel 122 or 127 of the selected totalizer is rocked into engagement with the corresponding teeth 121 or 126 in the actuator 76, after said actuator has completed its initial movement rearwardly and has been positioned by the depressed key 52. Return movement forwardly of said actuator, which is effected by return movement clockwise of the leading frame bar 88, revolves the wheel of the selected totalizer in an additive direction in proportion to the value of the depressed key. In subtract operations, the wheel 122 of the balance totalizer is engaged with the teeth 121 prior to initial movement rearwardly of the actuator 76, which movement rotates said wheel reversely to subtract therefrom the value of the depressed key.

Conditioning the machine for a subtract operation either by means of the control blocks 37 (Fig. 3) on the traveling carriage or by means of depression of the subtract key 60 (Fig. 1) sets up a condition which causes the add transfer pawl 124 to be rocked out of cooperative relationship with the tripping teeth on the cam 123 and simultaneously causes the subtract tripping pawl 125 to be rocked into cooperative relationship with said tripping teeth. When the wheel 122 passes from fifth to sixth place while being rotated in a subtractive direction, one of the four tripping teeth on the cam 123 rocks the pawl 125 in a counter-clockwise direction to cause 1 to be subtracted from the next higher order. Naturally, when the wheel 122 moves from fifth to sixth place while traveling in an additive direction, the adding pawl 124 is rocked clockwise to cause 1 to be added in the next higher order.

In sub-total and total-printing operations, the wheel of the selected totalizer is engaged with the actuator 76 prior to its initial movement rearwardly, which movement rotates said wheel reversely until one of the tripping teeth contacts the add transfer pawl to locate said wheel in zero position and to position the actuator 76 and the printing sector 93 in proportion to the amount standing on said wheel. In total-printing operations, after the wheel of the selected totalizer has thus been zeroized, it is disengaged from the actuator 76 and therefore remains in a zeroized condition. In sub-total-printing operations, the wheel of the selected totalizer remains in engagement with the actuator 76 during its return movement forwardly and, as a consequence, is returned to its original position, to reenter the amount therein.

The control plate 67 (Fig. 10), the detent 68 (Fig. 11) and the locking plate 69 (Fig. 9) for the keys 52 are not actuated by the A. M. and P. M. keys 53 and 54. However, each of these keys 53 and 54 has a separate detent for retaining them in depressed positions. The A. M. key 53 has a stud 133 which cooperates with a hook in a detent 134 (Fig. 3) and the P. M. key 54 carries a stud 135 which cooperates with a hook on a detent 136 (Fig. 3), said detents 134 and 136 being mounted for horizontal sliding movement between the rollers supported by the studs 70.

Mechanism under control of the traveling carriage is provided for shifting the detents 134 and 136 rearwardly against the action of their springs to release the depressed A. M. or P. M. keys when the traveling carriage is tabulated to certain columnar positions. Referring to Figs. 3 and 4, when the traveling carriage 34 is tabulated to certain columnar positions, the camming lugs 38 on the control blocks 37 engage the upturned ends of the hanging bar lever 39 and rock said lever clockwise upon its pivot 40. Clockwise movement of the lever 39, by means of a hanging bar 137, which connects said lever to a key releasing link 138 pivoted at 139 to a crank 140 secured on a shaft 141 journaled in the main framework 30, rocks said link 138 counter-clockwise upon its pivot 139. Counter-clockwise movement of the link 138 causes the vertical branch of an L-shaped slot 142 therein to be moved into engagement with a stud 143 in the arm 144, which, as previously stated, is driven by the bar 146.

When the vertical branch of the slot 142 is in engagement with the stud 143, rearward shifting movement of the bar 146 rocks the crank 140 and the shaft 141 first counter-clockwise. Fast on the right-hand end of the shaft 141 (Fig. 4) and moving in unison therewith is a crank 149 carrying a stud 150 (Fig. 3), which, in cooperation with upward projections 151 on each of the detents 134 and 136, shift said detents rearwardly to release the depressed A. M. and P. M. keys. When the traveling carriage is in positions other than the position where the lugs 38 engage the hanging bar lever 39, the horizontal branch of the L-shaped slot 142 remains in alinement with the stud 143, thus permitting the arm 144 to be moved back and forth without imparting movement to the link 138 and the shaft 141.

Units of hours keys

The units of hours keys 55 (Figs. 1 and 5) have associated therewith a control plate 150, a detent 153, and a locking plate 154, similar in every respect to the corresponding parts of the tens of minutes keys illustrated in Fig. 3 and explained above. The plate 150, the detent 153, and the plate 154 are mounted for horizontal shifting movement between rollers supported by studs 155 in the partition plate 45 for this bank. The control plate 150 and the detent 153 are connected by a spring 156, which urges them rearwardly and forwardly, respectively, to cause them to function properly. The keys 55 have square studs 157 (Figs. 4 and 5), which extend through vertical slots in the partition plate 45 and which are adapted to cooperate with corresponding graduated steps 158 on an actuator rack 159 mounted for horizontal shifting movement by means of the rod 77 and the bar 78.

The actuator 159 has therein a vertical slot which engages a stud 160 in a segment 161 free on the shaft 45. A projection of said segment 161 is normally maintained in contact with the leading frame bar 88 by a spring 162 tensioned between said segment and said bar. In this case the segment 161 has no corresponding printing sector and has nothing to do with the positioning of the printing sector for this particular bank. However, the actuator 159 has, at the rear end thereof, two sets of teeth which cooperate respectively with a corresponding wheel 163 of the No. 1 or balance totalizer and a corresponding wheel 164 of the No. 2 or adding totalizer.

The studs 157 in the units of hours keys 55 (Figs. 4 and 5) are also adapted to cooperate with corresponding graduated steps 165 in the top edge of a main actuator 166 supported for horizontal shifting movement by means of the rod 77 and by means of a horizontal slot 167 therein, in cooperation with a stud 168 fast in the auxiliary actuator 159. The rearward end of the actuator 166 has therein a vertical slot which engages a stud 169 in a printing sector positioning segment 170 free on the shaft 45 and connected by a link 171 to a printing sector (not shown) for the units of hours bank, which is similar in every respect to the printing sector 93 for the tens of minutes bank. Normally the main actuator 166 is connected in fixed relationship to the auxiliary actuator 159 by a latch 172 (Figs. 4, 5, and 7) pivoted at 173 to the auxiliary actuator 159 and urged clockwise by a spring 174 to normally maintain a square stud 175 in the forward end of said latch in engagement with a notch in a block 176 secured to the main actuator 166. The auxiliary actuator 159 is suitably notched (Fig. 7) to permit the stud 175 to pass beneath the actuator 166 and enter into the notch in the block 176.

The main actuator 166 (Figs. 4, 5, and 16) carries a block 177 adapted to be engaged by the tooth of a zero stop pawl 178 free on the shaft 74 when the main actuator is in zero position and no key in this bank is depressed. A vertical surface 1781 on the pawl 178 is adapted to be engaged by a bent-over extension, or flange, 179 of a stop pawl 180 for the auxiliary actuator 159, said pawl having a tooth which cooperates with a block 181 integral with said auxiliary actuator to stop said actuator in second position when the correction figure of 12 hours is automatically entered, as will be explained later. A spring 182 urges the pawl 180 clockwise, and the extension 179 urges the zero stop pawl 178 in the same direction to normally maintain an upward extension 183 of said pawl 178 in resilient engagement with a downward finger 184 secured to the control plate 149 (Figs. 5 and 16).

By referring to Fig. 5 it will be noted that the steps 158 of the auxiliary actuator 159 are two places to the left of the corresponding steps 165 of the main actuator 166.

Depressing one of the keys 55 shifts the control plate 149 forwardly, causing the finger 184 in cooperation with the extension 183 to rock the zero stop pawl 178 for the main actuator 166 counter-clockwise, said pawl 178, by means of the extension 179, in turn rocking the stop pawl 180 for the auxiliary actuator 159 also counter-clockwise out of the path of their respective blocks 177 and 181. Normally the latch 172 connects the main and the auxiliary actuators in fixed relationship to each other, as shown in Fig. 5, whereupon operation of the machine and initial movement rearwardly of the leading frame bar 88 permit said actuators to move in unison therewith until the corresponding step 165 on the main actuator, which, as previously stated, is two places in advance of the corresponding step 158 on the auxiliary actuator, contacts the stud of the depressed keys 55 to position said actuators, the printing sector for this bank, and the corresponding wheel of the selected totalizer or totalizers in proportion to the value of the depressed key 55. When no key 55 is depressed, the zero stop pawl 178 remains in the path of the block 177 and retains the main and the auxiliary actuators in zero position during movement of the leading frame bar 88. Prior to machine operation, the locking plate 154 (Fig. 5) shifts rearwardly to lock the undepressed keys against depression.

After the actuators have been positioned and printing has been effected, releasing movement is imparted to the release shaft 112, as explained earlier, causing a stud 185 in an arm 186 secured on said shaft, in cooperation with a camming projection on the detent 153, to shift said detent rearwardly to release the depressed key and to permit the control plate 149 to return rearwardly to normal position, as here shown, to cause the spring 182 (Fig. 4) to return the stop pawls 178 and 180 to effective position so that said pawls will latch over their respective blocks 177 and 181 when the actuators are returned forwardly to normal position by return movement of the leading frame bail 88.

Tens of hours keys

The tens of hours keys 56 (Figs. 6 and 8) have in the lower ends thereof square studs 187, which cooperate with graduated steps 188 on an auxiliary actuator 189, and with graduated steps 190 on a main actuator 191. The actuator 189 is mounted for horizontal reciprocating movement on the rod 77 and the bar 78, and the main actuator 191 is mounted for reciprocating movement by means of the rod 77 and a slot 192 therein, in cooperation with a stud 193 in the auxiliary actuator 189. The auxiliary actuator 189 has therein a vertical slot which engages a stud 194 in a segment 195 free on the shaft 45, said segment having no connection to the printing sector for this row of keys. A spring 196 normally maintains a projection of the segment 195 in contact with the leading frame bar 88. The auxiliary actuator 189 has on the rearward end thereof two sets of teeth, which cooperate with a corresponding wheel 197 on the No. 1 totalizer line and with a corresponding wheel 198 on the No. 2 totalizer line. The main actuator 191 (Fig. 4) has therein a vertical slot which engages a stud 199 in a printer segment 203 free on the shaft 45 and connected by a link 204 to a printing sector for the keys 56, which sector is exactly like the printing sector 93 (Fig. 3) for the keys 52.

A latch 205 (Figs. 4, 6, and 8), similar to the latch 172 for the keys 55 (Fig. 7), normally couples the auxiliary actuator 189 to the main actuator 191. The latch 205 is pivoted at 206 to the auxiliary actuator 189, and a spring 207 urges said latch clockwise to normally maintain a square stud carried thereby in engagement with a notch in a block 209 secured to the main actuator 191.

As long as the latch 205 is in effective position, as shown in Fig. 8, the auxiliary and the main actuators 189 and 191 remain coupled together and move in unison, and in this case the printing sector and the totalizer wheels for the keys 56 are positioned alike and in proportion to the depressed key 56. When the A. M. and P. M. keys 53 and 54 are both depressed in a machine operation, it then becomes necessary to add the corrective factor of 12 hours in the units and tens of hours banks, and in this case the latches 205 and 172 are moved to ineffective positions to uncouple the auxiliary actuators for their associated main actuators, as will be explained more fully later.

The bank of keys 56 (Fig. 6) has associated therewith a control plate 210, a detent 211, and a locking plate 212, similar in every respect to and functioning exactly like the similar plates for the keys 52 (Fig. 3) explained earlier herein, and said plates are mounted for horizontal shifting movement between rollers rotatably supported by studs 213 in the partition plate 43. A spring 214, connected between the control plate 210 and the detent 211, urges said parts rearwardly and forwardly, respectively, to normally maintain them in the positions here shown.

Depressing one of the keys 56 causes a stud 215 therein to shift the control plate 210 forwardly against the action of the spring 214, to cause a downwardly projecting finger 216 thereof, in cooperation with an upward extension 217 (Fig. 4) of a zero stop pawl 218 free on the shaft 74, to rock said pawl counter-clockwise against the action of a spring 219 out of the path of a block 220 carried by the main actuator 191. Counter-clockwise movement of the zero stop pawl 218 by means of a vertical surface thereon in cooperation with an extension 221 of an auxiliary stop pawl 222 also free on the shaft 74, likewise rocks said pawl 222 counter-clockwise against the action of a spring 223 to move two stopping surfaces 224 and 225 (Fig. 6) thereon out of the path of a block 226 secured to the auxiliary actuator 189. This frees the auxiliary and the main actuators 189 and 191 (Figs. 4, 6, and 8) to the action of the leading frame bar 88, which, upon machine operation, permits said actuators to move rearwardly in unison until the steps 188 and 190 thereof, which are in exact alinement, contact the stud 187 of the depressed key to position said actuators, the printing sector, and the selected totalizer wheel in proportion to the value of the depressed key 56. The locking plate 212 (Fig 6), under influence of the shaft 80, at the beginning of machine operation, locks all undepressed keys 56 against depression, until after printing has been effected and the totalizers have been actuated.

Near the end of adding and subtracting operations, releasing movement counter-clockwise of the shaft 112 causes an arm 227 secured thereon, in cooperation with a camming projection on the detent 211, to shift said detent rearwardly to release the depressed key. The shaft 112 and the arm 227 function in a like manner near the beginning of sub-total and total-printing operations to release any depressed key and to shift the control plate 210 forwardly to move the stop pawls 218 and 222 counter-clockwise out of engagement with their respective blocks 220 and 226 to permit the actuators 189 and 191, which are connected by the latch 205, to be positioned under influence of the corresponding wheel of the selected totalizer, to cause the amount on said wheel to be printed.

A. M. and P. M. keys

With the system used in the machine embodying this invention, when a transition from A. M. to P. M. time, or vice versa, occurs in a working period—for example, when an employee begins work in the A. M. period and leaves for lunch in the P. M. period—it is necessary to add a corrective figure of 12 hours to the units and tens of hours banks, the 2 being added in the units bank and the 1 being added in the tens bank. This is accomplished by depressing both the A. M. and the P. M. keys 53 and 54 (Figs. 1, 3, and 4) in the calculation of the "in" and "out" time of a single working period.

As previously explained, the A. M. and P. M. keys are stay-down keys, in that they remain depressed until after both the "in" and "out" entries have been made in a particular period, and at the end of the operation in which an "out" entry is being made, the traveling carriage, by means of the mechanism shown in Fig. 4 and explained earlier herein, sets up a condition which causes the key releasing mechanism to release the depressed A. M. and P. M. keys. In other words, if the A. M. key 53 is depressed during the operation in which the "in" entry of a particular period is being recorded, said key will remain depressed at the end of the operation, thereby making it unnecessary to depress the A. M. key again if the "out" entry in the same period is also A. M. time.

What has been said above in connection with the A. M. key applies equally as well to the P. M. key. However, when just one of these keys is used for both the "in" and the "out" entries of a particular period, they have no influence whatever upon the functioning of the machine, as the only time these keys are effective is when one of them is depressed for entering the "in" time of a period and the other is depressed for entering the "out" time of the same period. In other words, both the A. M. and the P. M. keys must be in depressed position during the calculation of the "out" time before the corrective factor of 12 hours is accumulated. The manner in which depression of both the A. M. and the P. M. keys causes the corrective factor of 12 hours to be entered will now be described.

Referring now to Figs. 4, 7, 12, and 13, the A. M. and P. M. keys 53 and 54 carry respectively similar studs 230 and 231, which cooperate with corresponding similar notches in opposite ends of a link 232 free on a stud 233 fast in a slide 234 mounted to shift vertically by means of two square studs 235 therein, in cooperation with a slot in the partition plate 44 (Fig. 3) for this particular bank. An extension of the stud 233 cooperates with an angular camming surface 236 on an upward extension of a bar 237 mounted to shift horizontally by means of parallel slots therein, in cooperation with studs 238 and 239 in the partition plate 44. A vertical slot in the forward end of the bar 237 embraces a stud 240 in an upward extension of a latch disengaging arm 241 (Figs. 4 and 7) free on the shaft 74 and connected by a rod 242 to a similar arm 243 (Fig. 8) for the tens of hours bank.

Depressing the A. M. key 53 shifts the forward end of the link 232 downwardly, as shown in Fig. 12, but does not impart sufficient downward movement to the stud 233 to cause said stud, in cooperation with the camming surface 236, to shift the bar 237. Likewise, depressing the P. M. key 54 shifts the rearward end of the link 232 downwardly without imparting any movement to the bar 237. Depressing both the A. M. and the P. M. keys 53 and 54 shifts the link 232 to the position shown in Fig. 13, causing the stud 233, in cooperation with the camming surface 236, to shift the bar 237 rearwardly to rock the arms 241 and 243 (Figs. 7 and 8) clockwise. Clockwise movement of the arms 241 and 243, in cooperation with studs 244 and 245 in the latches 172 and 205, respectively, shifts said latches downwardly or counter-clockwise against the action of their spring to disengage the studs 175 and 208, carried by said latches, from the notches in their respective blocks 176 and 209 (Figs. 7 and 8). This in turn disengages the auxiliary actuator 159 for the units of hours bank, and the auxiliary actuator 189 for the tens of hours bank, from their respective main actuators 166 and 191.

In case none of the keys 55 or 56 are depressed in the units and tens of hours banks, the zero stop pawls 178 and 218 for these banks (Fig. 4) will retain their respective main actuators in zero position while the auxiliary actuators for these two banks are free to move under influence of the leading frame bar 88. Initial movement of the leading frame bar permits the auxiliary actuator 159 (Fig. 8) to move rearwardly until the tooth of the pawl 180 engages the block 181 to stop said auxiliary actuator in second position to add 2 in the corresponding wheel of the balance totalizer. Movement of the auxiliary actuator 189 (Fig. 8) for the tens of hours bank, under influence of the leading frame bar, continues until the block 226 thereon engages the step 224 on the stop pawl 222 to arrest said auxiliary actuator in first position to cause 1 to be added in the corresponding wheel of the balance totalizer during return movement forwardly of said auxiliary actuator 189.

From the foregoing it is obvious that, when both the A. M. key 53 and the P. M. key 54 are depressed and no keys 55 or 56 are depressed in the units and tens of hours bank respectively, the main actuators for these banks will remain in zero position and consequently the printing sectors for these banks will be positioned in accordance therewith to print zeros on the record material. It is likewise obvious that, as the auxiliary actuators 159 and 189 for the units and tens of hours banks have been released from the main actuators and have been permitted to move to second and first positions, respectively, the corrective figure of 12 hours will be added in the units and tens of hours denominations, which is the result desired.

When any one of the keys 55, with the exception of the No. 8 and the No. 9 keys, in the units of hours banks is depressed, the zero stop pawl for this bank is released and consequently the main actuator 166 is free to move under influence of the leading frame bar, and as usual, the stud 157 in the depressed key, in cooperation with the corresponding step 190, arrests said actuator in a position commensurate with the value of the depressed key, to position, in turn, the printing sector for this bank in accordance therewith. In case both the A. M. and the P. M. keys 53 and 54 are depressed, the auxiliary actuator 159 is also free to move under influence of the leading frame bar until the step 158 thereon, corresponding to the depressed key, engages the stud 157 to position said auxiliary actuator 159 two steps in advance of the main actuator 166 to cause the corrective figure of 2 to be added in this bank. Since both the A. M. key 53 and the P. M. key 54 are depressed, the auxiliary actuator 189 is free to move one step during the machine operation until arrested by the shoulder 224 on stop pawl 221, and, therefore, the corrective figure of 1 is added in the tens of hours bank in the manner explained above.

Thus it is clear that, when the A. M. and the P. M. keys 53 and 54 are depressed and the No. 1 key 55 in the units of hours bank is depressed, 13, that is, 12 plus 1, will be added in the corresponding hour wheels of the balance totalizer, and so on up to and including the No. 7 units of hours key, which, plus the corrective figure of 12, would cause the total amount of 19 to be added in the hour wheels of the balance totalizer.

When the "8" key 55 of the units of hours bank is depressed and the A. M. key 53 and the P. M. key 54 are both depressed, it becomes necessary to add 12 plus 8, which equals 20, into the hour wheels of the totalizer. To accomplish this, automatic means is provided to arrest the units auxiliary actuator 159 in its zero position and the tens auxiliary actuator 189 in the "2" position during the machine operation. At the same time, the main actuator 166 in the units order is arrested in the "8" position to properly adjust the type carrier for printing "8" on the record material, and the main actuator 191 in the tens order is arrested in its zero position. Therefore, during the machine operation, the sum of "20" is added into the lapsed time totalizer, and "8" is recorded on the record material.

When the "9" key 55 of the units of hours bank is depressed and the A. M. key 53 and the P. M. key 54 are both depresesd, it becomes necessary to add 12 plus 9, which equals 21, into the hour wheels of the totalizer. To accomplish this, automatic means is provided to arrest the units auxiliary actuator 159 in its "1" position and the tens auxiliary actuator 189 in its "2" position during the machine operation. At the same time, the main actuator 166 in the units order is arrested in its "9" position to properly adjust the type carrier for printing "9" on the record material, and the main actuator 191 in the tens order is arrested in its zero position. Therefore, during the machine operation, the sum of "21" is added into the lapsed time totalizer and "9" is recorded on the record material.

By observing Figs. 1 and 2 it will be seen that 12:59 A. M. or P. M. is the largest number used or set up on the keyboard in the figuring of elapsed time, and therefore it is obvious that, in the calculation of elapsed time, only the No. 1 key 56 in the tens of hours row will ever be used. Therefore, when both the A. M. and the P. M. keys 53 and 54 are depressed and the No. 1 key 56 is simultaneously depressed, the stop pawl 222 will be rocked counter-clockwise in unison with the zero stop pawl for this bank, so that both the steps 224 and 225 are out of the path of the block 226. In this case, the stud 187 in the depressed No. 1 key, in cooperation with a vertical surface 249 on the auxiliary actuator 189, will arrest said actuator in its second position to cause the corrective figure of 12 plus 10, or 22, to be added in the hour wheels, and at the same time the stud 187 will arrest the main actuator 191 in its first position to cause the value of the depressed key to be printed on the record material.

The mechanism associated with the No. 8 and No. 9 units of hours keys for accomplishing the results outlined in general above in the last three paragraphs, will now be described in detail.

Referring to Figs. 4, 5, 7, 14, and 15, the slide 234 carries a stud 250 which rotatably supports a hub 251 fast in an auxiliary actuator positioning pawl 252 urged clockwise by a spring 253 to normally maintain one wall of a cut-away portion of the hub 251 in contact with a pin 254 in the stud 250. The pawl 252 is effective to arrest the auxiliary actuator 159 only when a units of hours key 8 or 9 is depressed, when both the A. M. key and the P. M. key are depressed. As previously explained, the slide 234 is connected to the link 232, and as a result, its vertical positioning is controlled by the A. M. and P. M. keys 53 and 54. When said keys are in an undepressed position, as shown in Fig. 7, a downward projection 255 (Fig. 14) of the pawl 252 is maintained out of the path of a positioning block 256 secured to the auxiliary actuator 159 for the units of hours bank. Likewise, when either one, but not both, of the A. M. or P. M. keys 53 or 54 is depressed, the projection 255 still remains out of the path of the block 256 and consequently has no effect upon the positioning of the actuator 159. Depressing both the A. M. and the P. M. keys, which occurs, as explained above, when a transition of time takes place in any one period, moves the projection 255 into the path of the block 256. However, if neither the No. 8 nor the No. 9 key 55 is depressed, the pawl 252 is free to rotate counterclockwise and is, therefore, not effective to arrest the auxiliary actuator 159, and simply rides on the top surface of the block 256 without having any effect whatever on the positioning of the actuator 159.

When the pawl 252 is in normal or upward position, as shown in full lines in Fig. 7, a surface 257 on said pawl is opposite a stud 258 in the undepressed No. 8 key 55. Depressing both the A. M. and the P. M. keys moves the pawl 252 to a position where the surface 257 is beneath the stud 258, and, as the pawl 252 clears the stud 157 (Fig. 15), said pawl is free to move counter-clockwise when the actuator 159 moves rearwardly.

As previously explained, depressing both the A. M. and the P. M. keys causes the corrective figure of 12 to be added in the hour wheels of the balance totalizer. However, when the No. 8 key in the units of hours bank is depressed with both the A. M. and the P. M. keys depressed, the value of said No. 8 key, plus the corrective figure of 12, requires that the amount of 20 be added in the hour wheels of the balance totalizer, which in effect amounts to a transfer of one digit from the units to the tens of hours bank.

Depressing the No. 8 key 55 (Fig. 14), when both the A. M. and the P. M. keys are depressed, moves the square stud 258 into the path of the surface 257 of the pawl 252 to obstruct counter-clockwise movement of said pawl, causing the projection 255, in cooperation with the block 257, to retain the auxiliary actuator for the units of hours bank in zero position, as here shown. Likewise, depressing the No. 8 key 55 (Fig. 8) causes a stud 259 carried thereby, in cooperation with an angular camming surface on a projection 260 of a bar 261, mounted for horizontal sliding movement by means of slots therein, in cooperation with studs 262 and 263 in the partition plate 45, to shift said bar forwardly. Forward movement of the bar 261 causes a vertical surface 264 on the forward end thereof, in cooperation with a stud 265 in an upward extension of the stop pawl 222, to rock said pawl counter-clockwise against the action of the spring 223. Counter-clockwise movement of the pawl 222, under influence of the bar 261, moves the step 224 out of the path of the block 226 and moves the step 225 into the path of said block, to cause the auxiliary actuator 189 for the tens of hours bank to be stopped in second position. This causes 2 to be added in the tens of hours wheel of the balance totalizer, while the depressed No. 8 key 55 positions the main actuator 166 and the printing sector for the units of hours bank in eighth position, to print the value of the depressed key. The zero stop pawl 218 (Fig. 4) retains the main actuator 191 for the tens of hours bank in zero position, as no key has been depressed in this bank, to properly position the printing sector for said bank.

When the No. 9 key 55 for the units of hours bank is depressed, with both the A. M. and the P. M. keys 53 and 54 depressed, it is necessary to add 21 in the hour wheels of the balance totalizer. Depressing the No. 9 key (Fig. 15) moves a stud 266 in the lower end thereof into the path of a hook-shaped extension 267 of the pawl 252, whereupon initial movement rearwardly of the auxiliary actuator 159, under influence of the leading frame bar 88, causes the block 256 to engage the downward projection 255 of the pawl 252 and rock said pawl counter-clockwise against the action of its spring 253 until the extension 267 engages the stud 266. This arrests the auxiliary actuator 159 in first position to cause 1 to be added in the units of hours wheel of the balance totalizer. Likewise, depressing the No. 9 key 55 (Fig. 8) causes a stud 268 carried thereby, in cooperation with an angular camming surface on an upward extension 269 on the bar 261, to shift said bar forward to rock the stop pawl 222 counter-clockwise to move the step 224 thereof out of the path of the block 226 and to move the step 225 into the path of said block to cause the auxiliary actuator 189 for the tens of hours bank to be located in second position to cause 2 to be added in the tens of hours wheel of the balance totalizer.

As in the case of the #8 key, the depressed #9 key positions the main actuator 166 for the units of hours bank, and its associated printing sector, in proportion thereto, to cause the value of said key to be printed, and the zero stop pawl 218 (Fig. 4) retains the main actuator 191 for the tens of hours bank in zero position, as no key has been depressed in this bank. When both the A. M. and the P. M. keys are depressed, and neither the #8 nor the #9 key in the units of hours bank is depressed, a clearance cut in the stud 266 (Fig. 7) permits the pawl 252 to rock counter-clockwise when the auxiliary actuator 159 moves rearwardly.

By referring to Fig. 1 and considering the foregoing explanation, it will be seen that only the keys 51, 52, 55, and 56 are used in conjunction with the A. M. and the P. M. keys 53 and 54 for the computation of elapsed time. The symbol keys 50 may or may not, as desired, be used in connection with the time keys as a means of identifying certain items of time. It will likewise be remembered that the #1 key 56 in the tens of hours row is the only key used in this row in the computation of elapsed time.

It will be noted that the A. M. key 53 has the designation "N," which signifies that this key is used in the computation of noontime as well as A. M. time, which includes the time from 12 noon up to and including 12:59 P. M. It will also be noted that the P. M. key 54 has the designation "M," which means that this key is used in the computation of midnight time as well as P. M. time, which includes the time from 12 midnight up to and including 12:59 A. M.

As previously explained, the tens of minutes keys 52 transfer 1 to the next higher order, or units of hours, when the balance totalizer wheel for this order moves from fifth or 50-minute position to zero or 60-minutes position. In other words, the corresponding wheel of the balance totalizer transfers 1 to the next higher order when it moves through six positions, and this prevents the minutes keys from being used in the computation of regular amounts, such as dollars and cents. However, the keys 55, 56, and 57 may be used in the computation of regular amounts and may be used in conjunction with the keys 51 and 52 for computing total time over an extended period and also for the recapping of total time. An example of computing total time would be the addition of the total weekly time to obtain the total monthly time, or the addition of the total monthly time to obtain the total yearly time.

When the machine is used in the computation of total time, a covering is provided for covering the A. M. and the P. M. keys 53 and 54, so that these keys will not be depressed inadvertently. Likewise, when the machine is used for the computation of regular amounts, a cover is provided for the minute keys 51 and 52 and the A. M. and the P. M. keys 53 and 54.

MODE OF OPERATION

One of the many ways in which the machine embodying the instant invention may be used to advantage is in the computation of the elapsed time worked by the employees of a large business establishment, said time being computed, as a rule, at the end of each week. A weekly record of time is usually prepared by each employee as he registers "in" and "out" during the different periods of the day by inserting a time card in a time clock and punching said time clock as he comes and goes. At the end of a weekly period, the data on each time card is transferred to a corresponding ledger sheet, and the elapsed time is simultaneously computed by the machine to obtain a weekly total, and, if desired, a monthly total may be obtained after the weekly total has been established.

A specific example of use is illustrated by the facsimile of one employee's (John Doe's) ledger sheet, which is shown in Fig. 2 and which forms a basis for the explanation of operation now to follow.

Using John Doe's weekly time card as a guide, the operator selects his ledger sheet, inserts said ledger sheet in the open throat of the front feed carriage, adjusts said sheet to the proper line (Monday), and then closes the throat of the carriage. With the carriage in starting position, the operator sets up the first "in" entry for Monday (8:25) by depressing the A. M. key 53 (Fig. 1), the #8 key 55, the #20 key 52, and the #5 key 51. Operation of the machine with the carriage in first columnar position causes the time (8:25) to be printed in the "in" column of the A. M. period and the tappet on the carriage, through the connections described, conditions the machine for subtract operations and thereby causes the amount to be simultaneously subtracted from the previously cleared balance totalizer, thus leaving a complementary amount in said balance totalizer. Near the end of this first operation, the traveling carriage tabulates automatically from the "in" column to the "out" column for the A. M. period, and the key releasing mechanism functions to release the depressed time keys. However, the depressed A. M. key remains depressed, as the releasing mechanism for the A. M. and P. M keys does not function during this operation Next, the "out" time (11:40) for the A. M. period is set up on the time keys and the machine is released for operation, during which 11:40 is added to the complementary amount in the balance totalizer, which gives an elapsed time of three hours and fifteen minutes between the 8:25 A. M. and the 11:40 A. M. times. At the end of this operation, the key releasing mechanism functions to release the time keys, and, as the traveling carriage is in the "out" columnar position, the camming lug 38 (Fig. 4) on the control block 37 rocks the hanging bar lever 39 to render the releasing mechanism for the A. M. and the P. M. keys effective to cause the depressed A. M. key to be released at the end of this operation As before, the traveling carriage tabulates automatically to the "in" column of the P. M. period.

Next, the "in" time (12:10) for the P. M. period is set up on the time keys, and, as the noon period from 12 noon until 12:59 inclusive is considered as A. M. time, the A. M. key 53 is depressed and the machine is released for operation, during which the time (12:10) is subtracted from the balance totalizer and is simultaneously printed in the "in" column of the P. M. period. At the end of this operation, the key releasing mechanism functions to release the depressed time keys, and the traveling carriage tabulates automatically to the "out" column for the P. M. period.

Next, the "out" time (4:05) for the P. M. period is set up on the time keys, and, as this is P. M. time, the P. M. key 54 is depressed, thus making both the A. M. and the P. M. keys depressed, and the machine is released for operation. Inasmuch as both the A. M. and the P. M. keys are depressed, the corrective figure of 12, which must be added when a transition of time takes place in any one period, is automatically added in the units and tens of hours wheels of the balance totalizer. As both the A. M. and the P. M. key are depressed during this operation, the auxiliary actuators 159 and 189 (Figs. 7 and 8) for the units and tens of hours banks are released, and, as the #4 key 55 in the units of hours bank 55 has been depressed, the stop pawl 190 (Fig. 7) is rocked to ineffective position to permit the stud 157 in said key, in cooperation with the corresponding steps 165 and 158 of the main and auxiliary actuators for this particular bank, to position said actuators at 4 and 6, respectively, to cause the value of the depressed keys to be printed on the ledger sheet and to cause the value of the depressed key, plus the units digit 2 of the corrective figure of 12, to be added in the corresponding wheel of the balance totalizer. In this case, the first step 224 (Fig. 8) on the stop pawl 222 is effective and stops the auxiliary actuator 189 for the tens of hours bank at 1 position to add the tens digit 1 of the corrective figure of 12 in the corresponding wheel of the balance totalizer. The zero stop pawl 218 (Fig. 4) stops the main actuator 191 in zero position to properly position the printing sector for this denomination. This causes the time 4:05 plus the corrective figure of 12 to be added in the balance totalizer which gives a total elapsed time for the day of seven hours and ten minutes.

The computation of the elapsed time for Monday is given below in a more specific form. In reading this computation, it must be remembered that the tens of minutes wheel moves from "5" to "0" in adding and from "0" to "5" in subtracting.

| | |
|---|---|
| 0000:00 | Balance totalizer clear. |
| 8:25 | "In" entry is subtracted. (Hour keys and A. M. key depressed—no corrective entry) |
| 9991:35 | Complement of balance. |
| 11:40 | "Out" entry is added. (Hour keys and A. M. key depressed—no corrective entry) |
| 0003:15 | Total of first elapsed time period. |
| 12:10 | "In" entry is subtracted. (Hour keys and A. M. key depressed—no corrective entry) |
| 9991:05 | Complement of balance. |
| 4:05 | "Out" entry is added. (Hour keys, |
| 12:00 | A. M., and P. M. keys depressed, therefore corrective entry of 12 is automatically added at the same time 4:05 is added) |
| 0007:10 | Total of both elapsed time periods. |

After the above operation has been completed, the traveling carriage is returned to starting position or the "in" column for the A. M. period, and at the same time the platen roll is rotated to line-space the record material to bring the second day of the week, Tuesday, in alinement with the printing mechanism. The computation of the elapsed time for Tuesday proceeds in exactly the same manner as explained above for Monday, except that the "out" time of 8:20 in the P. M. period, plus the corrective figure of 12, causes 20 to be added in the hour wheels of the balance totalizer, and at the same time the depressed units of hours key #8 stops the main actuator for this particular bank at 8 and the main actuator for the tens of hours bank is stopped in zero position to print the proper entry of 8:20 upon the ledger sheet. Depressing the #8 key 55 (Fig. 14), when both the A. M. and the P. M. keys are depressed, moves the stud 258 in said key in the path of the surface 257 of the pawl 252 to cause said pawl to retain the auxiliary actuator 159 for the units of hours bank in zero position, as explained earlier herein. Likewise, depressing the #8 key, by means of the mechanism shown in Fig. 8, rocks the step 224 of the stop pawl 222 out of the path of the block 226 and rocks the step 225 on said pawl into the path of said block, to stop the auxiliary actuator for the tens of hours bank in its second position.

After the 8:20 entry has been made, the traveling carriage is automatically returned to starting position and the platen roll is simultaneously line-spaced to bring the line of the ledger sheet for Wednesday opposite the printing mechanism. The entries for Wednesday are made in exactly the same manner as explained above, with the exception of the "out" entry (9:30) for the P. M. period, which, plus the corrective figure of 12, causes 21 to be added in the hour wheels of the balance totalizer.

Depressing the #9 key 55 (Fig. 15), when both the A. M. and the P. M. keys are depressed, moves the stud 266 in said key opposite the hook-shaped extension 267 of the pawl 252, causing said pawl to locate the auxiliary actuator 159 for the units of hours bank in 1 position to enter the proper amount in the corresponding wheel of the balance totalizer. The main actuator 166 for this bank is permitted to go to ninth position, to properly set the printing sector so that the amount of 9 will be printed in the proper column of the ledger sheet. Depressing the #9 key 55 (Fig. 8), like depressing the #8 key, rocks the step 224 of the stop pawl 222 out of the path of the block 226 and rocks the step 225 of said pawl into the path of said block, to position the auxiliary actuator 189 for the tens of hours bank in two positions, to cause 2 to be entered or added in the corresponding wheel of the balance totalizer, and, as no keys are depressed in the tens of hours bank, the zero stop pawl for this bank retains the main actuator 191 in zero position to properly position the corresponding printing sector.

After the remaining entries have been made and the elapsed time for the remaining days of the week has been figured, the traveling carriage is tabulated to the "Total time weekly" column and the sub-total key 59 (Fig. 1) and the balance key 62 are depressed in the order named, to initiate a sub-total operation in the balance totalizer, to cause a sub-total of the balance (53:22) to be printed in the "Total time weekly" column of the ledger sheet. After this, the traveling carriage is tabulated to the "Total time monthly" column and the balance key 62 is depressed to initiate a balance operation, during which the balance totalizer is zeroized and the total therein (53:22) is printed in the "Total time monthly" column of the ledger sheet.

At the end of the following week, the elapsed time which John Doe has worked is again figured and entries are made in the proper columns of the ledger sheet exactly as explained above. However, on Tuesday of the second week, John Doe has worked overtime from 5:30 P. M. to 7:20 P. M., which time is figured in exactly the same manner as the "in" and "out" times for the A. M or P. M. period. In other words, the "in" time of 5:30 P. M. is subtracted from the balance totalizer and the "out" time of 7:20 P. M. is added to the balance totalizer to obtain the elapsed time for the overtime period.

After all of the elapsed time has been figured for the second week, the operator tabulates the traveling carriage to the "Total time weekly" column, and in a sub-total printing operation causes the sub-total of 46:19 to be printed in the "Total time weekly" column. Next, the traveling carriage is tabulated to the "Total time monthly" column and the platen roll is simultaneously backed up one line space, after which the total elapsed time for the preceding week (53:22) is set up on the time keys and the machine is released for an adding operation, during which the total time for the previous week is added to the total time for the present week. At the end of the above operation, the ledger sheet is line-spaced. Next, the balance key 62 (Fig. 1) is depressed, and, in a balancing operation, the No. 1 or balance totalizer is cleared and the total time therein (99:41) is printed in the "Total time monthly" column of the ledger sheet.

The computation of the elapsed time for the succeeding weeks of the month is but a repetition of the procedure outlined above.

Instead of printing the total elapsed time monthly, at the end of each weekly period, an alternative is to compute this time at the end of each month. Instead of performing a sub-total printing operation in the balance totalizer to obtain the "Total time weekly," clear said balance totalizer to obtain the total time weekly, and at the end of a monthly period, after all the weekly totals have been computed, set these totals up on the time keys and add them, one at a time, into the cleared balance totalizer. After this, a balancing operation is performed in said balance totalizer to print the "Total time monthly" in the proper column of the ledger sheet.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the character described for computing the elapsed time between the "in" and "out" times of A. M. and P. M. work periods, said machine having a balance totalizer, printing means, and keys for controlling the positioning of corresponding wheels of the balance totalizer and for controlling the positioning of corresponding type carriers of the printing means, the combination of main actuators controlled by said keys to adjust the type carriers; auxiliary actuators to control the entry of amounts into the balance totalizer; means normally effective to connect the auxiliary actuators to the main actuators for unitary movement therewith, to position the type carriers and the totalizer wheels commensurate with the value of the depressed keys; an A. M. control key; a P. M. control key; means operated by the joint depression of both the A. M. and P. M. control keys to disengage the connecting means; and means to control the auxiliary actuators when they are disconnected from the main actuators to cause a fixed corrective figure to be entered in the balance totalizer, when the A. M. and the P. M. keys are jointly depressed prior to a machine operation.

2. In a machine of the class described for computing the elapsed time between the 'in" and "out" times of A. M. and P. M. work periods, said machine having a balance totalizer, printing means, and amount keys for controlling the positioning of corresponding wheels of the balance totalizer and for controlling the positioning of corresponding type carriers of the printing means, the combination of main actuators adjusted under control of the said keys to adjust the type carriers; auxiliary actuators to enter amounts into the balance totalizer; means normally effective to connect the auxiliary actuators to the main actuators for unitary movement therewith, to position the type carriers and the totalizer wheels commensurate with the value of the depressed keys; an A. M. control key; a P. M. control key; means rendered effective by the joint depression of both the A. M. and P. M. control keys in one machine operation to disengage the connecting means; means, including stop pawls associated with the auxiliary actuators and effective when no amount keys are depressed to control the positioning of said auxiliary actuators, to cause a corrective figure to be entered in the balance totalizer; means to move the stop pawls to ineffective positions when any of the amount keys are depressed; and means including steps on the auxiliary actuators and studs in the depressed keys cooperating with said steps, said means effective only when the control keys and amount determining keys are depressed to control the location of said auxiliary actuators in positions corresponding to the value of the depressed keys plus a fixed corrective figure, to cause the sum of the value of the depressed time keys and the corrective figure to be entered in the balance totalizer, while the true value of the depressed keys is recorded by the printing means.

3. In a machine of the class described, for computing the elapsed time between the "in" and "out" times of A. M. and P. M. work periods, said machine having a balance totalizer, printing means, and minute and hour keys for controlling the corresponding wheels of the balance totalizer and for controlling the corresponding type carriers of the printing means, the combination of main actuators for adjusting the type carriers; auxiliary actuators for entering amounts into the corresponding totalizer wheels; means normally effective to connect the main and the auxiliary actuators for unitary movement to cause the corresponding totalizer wheels and type carriers to be positioned in proportion to the depressed hour keys; an A. M. key for use with the minute and hour keys when the time being entered is A. M. time; a P. M. key for use with the minute and hour keys when the time being entered is P. M. time; means rendered effective by the joint depression of the A. M. and the P. M. keys for an entry operation to render the connecting means for the auxiliary and the main actuators ineffective; means effective when the connecting means is ineffective and when no hour keys are depressed, to position the auxiliary actuators independently of the main actuators to enter a corrective figure of 12 hours in the balance totalizer; and means effective when the connecting means is ineffective and when any of the hour keys are depressed to cause the positioning of the auxiliary actuators to a position corresponding to the value of the depressed hour keys plus the corrective figure of 12 hours, to cause the sum of the value of the depressed hour keys and the corrective figure of 12 hours to be added in the hour wheels of the balance totalizer, while the main actuators function in a normal manner to position the hour type carriers to the value of the depressed hour keys, to cause said value to be recorded.

4. In a machine of the class described, having a totalizer, printing means and item keys for controlling the positioning of a corresponding wheel of the totalizer and a corresponding type carrier of the printing means, the combination of a two-part actuator, one part of which is associated with the corresponding type carrier and the other part of which is associated with the corresponding totalizer wheel for transferring the values set up on the item keys to said type carrier and totalizer wheel; means normally effective to connect the two parts of the actuators together for unitary movement so that the corresponding type carrier and totalizer wheel will be positioned in accordance with the value of the depressed item key; two control keys; means effective when the control keys are jointly depressed in one operation, to render the connecting means ineffective; means effective when no item key is depressed and the connecting means is ineffective to control the positioning of the part of the actuator associated with the totalizer to cause a certain amount to be entered in said totalizer; means, effective when no item key is depressed, to arrest the part of the actuator associated with the type carrier at zero to properly position said type carrier; means effective when any one of the item keys is depressed and the connecting means is ineffective to render the last two named means ineffective; and means, effective when the said last two mentioned means and the connecting means are ineffective, to cause the depressed item key to control the positioning of the part of the actuator associated with the totalizer wheels to enter the value of the depressed item key, plus the certain amount, into the corresponding totalizer wheel, while said depressed item key controls the positioning of the other part of the actuator to cause the type carrier to be positioned in accordance with the value of the depressed item key to cause the value of the depressed item key to be recorded.

5. In a machine of the character described, having a totalizer, printing means, and two orders of item keys for controlling the positioning of corresponding wheels of the totalizer and corresponding type carriers of the printing means, the combination of a main actuator for each order of item keys for transferring the value of depressed ones of said keys to the corresponding type carriers; an auxiliary actuator for each order of item keys, said actuators normally effective to enter an amount equal to the value set on the corresponding main actuators into the corresponding totalizer wheels; means normally effective to connect the main and auxiliary actuators of each order for unitary movement; means to drive the actuators; control keys; means rendered effective by joint depression of the control keys to render the connecting means ineffective to permit independent positioning of the main and auxiliary actuators under influence of their driving means; means effective when the connecting means is ineffective and when none of the item keys are depressed for controlling the positioning of the auxiliary actuators to cause a fixed amount of two digits to be entered in the corresponding wheels of the totalizer, while the main actuators are held at zero to properly position the corresponding type carriers; means effective when the connecting means is ineffective and when any of the units item keys, the value of which, plus the units digit of the fixed amount is less than 10, is depressed to cause the auxiliary actuator for the units order to be located in a position corresponding to the sum of the value of the depressed key plus the units digit of the fixed amount, to cause said sum to be entered in the corresponding wheel of the totalizer; means effective when the connecting means is ineffective and when the sum of the depressed units item key plus the units digit of the fixed amount is 10 or more, to cause the units auxiliary actuator to be located in a position corresponding to the units digit of the sum; and means controlled by the depressed units item key when the sum of the value of said key plus the units digit of the fixed amount is ten or more, to cause the tens order auxiliary actuator to be positioned one step in advance to provide what is, in effect, a carry or transfer from the units order to the tens order, to cause the sum of the fixed amount plus the value of the depressed key to be entered in the totalizer, while the main actuators function normally to cause the corresponding type carrier to be positioned in proportion to the value of the depressed keys.

6. In a machine of the character described, having a totalizer, printing means, and item keys to control the positioning of a corresponding wheel of the totalizer and to control the positioning of a corresponding type carrier of the printing means, the combination of a two-part actuator differentially controlled by the item keys, including a main part and an auxiliary part, said main part being associated with the corresponding type carrier and said auxiliary part being associated with the corresponding totalizer wheel; means to drive the two parts of the actuator; means to normally connect the two parts of the actuator for unitary movement to cause the corresponding totalizer wheel and the corresponding type carrier to be positioned in accordance with the value of the depressed item key; two control keys; means operated by the joint depression of the control keys to render the connecting means ineffective, to permit independent positioning of the two actuator parts; and means rendered effective by the joint depression of the control keys and controlled by certain of the item keys when depressed, to terminate the driving movement of the auxiliary part of the actuator in one direction to locate said auxiliary part in positions corresponding to the value of said certain keys, plus a fixed amount to cause the sum of said fixed amount and said value of said keys to be entered in the corresponding wheel of the totalizer while the main part of the actuator is positioned under control of the depressed item key to cause the value of said key to be recorded.

7. In a machine of the class described, having a totalizer, printing means, and units and tens item keys for controlling the positioning of corresponding wheels of the totalizer and for controlling the positioning of corresponding type carriers of the printing means, the combination of main actuators controlled by the item keys to differentially adjust the corresponding type carriers; auxiliary actuators to enter amounts into totalizer wheels; means normally effective to connect the main and auxiliary actuators for unitary movement to cause the corresponding totalizer wheels and type carriers to be positioned in accordance with the value of the depressed item keys; two control keys; means rendered effective by the joint depression of the control keys to render the connecting means for the actuators ineffective to permit the main and auxiliary actuators to be positioned independently of each other; means effective when the control keys are jointly depressed and none of the item keys are depressed to control the positioning of the auxiliary actuators to cause a fixed amount of two digits to be entered in the corresponding wheels of the totalizer while the corresponding type carriers are positioned at zero; means effective when the control keys are jointly depressed and when a units item key, the value of which plus the units digit of said fixed amount is less than 10, is depressed, to cause the auxiliary actuator for the units order to be positioned in accordance with the sum of said units fixed digit and said depressed item key; means effective when the control keys are jointly depressed and when a units item key, the value of which plus the units digit of the fixed amount is 10 or more, is depressed, to cause the auxiliary actuator for the units order to be positioned in accordance with the sum of the value of said item key plus the units digit of said fixed amount; and means controlled by depression of a units item key, the value of which plus the units digit of the fixed amount is ten or more, to cause the auxiliary actuator for the tens order to be advanced one step to provide what is in effect a carry or transfer from the units auxiliary actuator to the tens auxiliary actuator.

8. In a machine of the character described, having a totalizer and printing means, the combination of key-controlled means to actuate the printing means; a second actuating means normally controlled by the first actuating means to actuate the totalizer; normally effective means to connect the two actuating means for unitary movement so that the totalizer and the printing means are actuated alike; a plurality of control keys; a differentially movable means moved one extent by the operation of either one of the control keys and a greater extent when operated jointly by more than one of the control keys; settable means operable by the differentially movable means when moved said greater extent to render the connecting means for the two actuating means ineffective; and means to control the positioning of the totalizer actuating means independently of the other actuating means to cause one amount to be entered in the totalizer and to cause another amount to be printed by the printing means.

9. In a machine of the class described, having a totalizer and printing means, the combination of key-controlled means to actuate the printing means; key-controlled means to actuate the totalizer; control keys operable either singly or jointly; means to normally connect the two actuating means for unitary movement so that the totalizer and the printing means will be actuated commensurate with the value of the depressed key; and means effective only when the control keys are jointly operated to render the connecting means ineffective to release the actuator for the totalizer for movement independently of the actuator for the printing means, said actuator for the totalizer being constructed so as to coact with the depressed key to enter a digit into the totalizer, the value of which digit varies from the value of the digit set up on the depressed key the same amount for any key, to cause an amount equal to the value of the depressed key, plus a fixed amount, to be entered into the totalizer, while the printing means is positioned commensurate with the value of the depressed key.

10. In a machine of the class described, having a totalizer, printing means, and a row of number keys to control the positioning of a corresponding wheel of the totalizer and to control the positioning of a corresponding type carrier of the printing means, the combination of an actuator adapted to be positioned under control of the depressed number key to adjust the type carrier commensurate with the value of the depressed key; an actuator connected to the above actuator for entering an amount commensurate with the value of the depressed number key into the corresponding totalizer wheel; and means to disconnect the two actuators to cause the actuator for the totalizer wheel to be positioned independently of the actuator for the type carrier, the actuator for the totalizer having stops coacting with the depressed key and spaced therefrom to such an extent that the actuator moves a fixed extent in relation to the depressed key and type carrier actuator so that the value of the depressed key plus a fixed corrective figure is entered into the totalizer wheel, while the type carrier is positioned commensurate with the value of the depressed key.

HENRY F. LANG.